United States Patent
Adler et al.

(10) Patent No.: US 7,695,001 B2
(45) Date of Patent: Apr. 13, 2010

(54) VEHICLE PROTECTION APPARATUS WITH COVER HAVING A RUPTURABLE PORTION WITH TEAR TABS

(75) Inventors: Angelo Adler, Armada, MI (US); Robert R. Debbs, Yale, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 212 days.

(21) Appl. No.: 11/218,121

(22) Filed: Sep. 1, 2005

(65) Prior Publication Data

US 2007/0045995 A1 Mar. 1, 2007

(51) Int. Cl.
*B60R 21/205* (2006.01)
*B60R 21/215* (2006.01)

(52) U.S. Cl. .................. 280/728.3; 280/732

(58) Field of Classification Search ............. 280/728.3, 280/732
See application file for complete search history.

(56) References Cited

U.S. PATENT DOCUMENTS

| | | | | |
|---|---|---|---|---|
| 4,903,986 A | * | 2/1990 | Cok et al. ............. | 280/728.2 |
| 5,062,663 A | * | 11/1991 | Satoh .................. | 280/728.3 |
| 5,096,220 A | * | 3/1992 | Nakajima ............. | 280/728.3 |
| 5,303,951 A | * | 4/1994 | Goestenkors et al. .. | 280/728.3 |
| 5,342,090 A | * | 8/1994 | Sobczak et al. ........ | 280/732 |
| 5,354,093 A | * | 10/1994 | Schenck et al. ........ | 280/728.3 |
| 5,435,594 A | * | 7/1995 | Gille ................... | 280/728.2 |
| 5,445,409 A | * | 8/1995 | Abramczyk et al. .... | 280/728.2 |
| 5,470,097 A | * | 11/1995 | Elqadah et al. ........ | 280/728.3 |
| 5,709,402 A | * | 1/1998 | Leonard ............... | 280/728.2 |
| 5,794,967 A | * | 8/1998 | Manire ................ | 280/728.3 |
| 5,845,929 A | * | 12/1998 | Schlett et al. .......... | 280/728.3 |
| 5,845,931 A | * | 12/1998 | Nagy et al. ........... | 280/728.3 |
| 5,904,367 A | * | 5/1999 | Warnez et al. ......... | 280/728.3 |
| 6,126,191 A | * | 10/2000 | Pepperine et al. ...... | 280/728.2 |
| 6,296,270 B1 | * | 10/2001 | Amamori ............. | 280/728.2 |
| 6,325,407 B1 | * | 12/2001 | Soderquist ........... | 280/728.2 |
| 6,341,796 B1 | * | 1/2002 | Preisler .............. | 280/728.3 |
| 6,467,801 B1 | * | 10/2002 | Preisler et al. ......... | 280/728.3 |
| 6,581,958 B2 | * | 6/2003 | Holtz ................. | 280/728.3 |
| 6,588,794 B1 | * | 7/2003 | Derrick et al. ......... | 280/728.3 |

(Continued)

FOREIGN PATENT DOCUMENTS

JP 04163255 A * 6/1992

(Continued)

*Primary Examiner*—Paul N Dickson
*Assistant Examiner*—Karen Jane Amores
(74) *Attorney, Agent, or Firm*—Tarolli, Sundheim, Covell & Tummino LLP

(57) ABSTRACT

A vehicle occupant protection apparatus (10) includes an inflatable occupant protection device (18) and a member (20) that defines a deployment opening (22) through which the inflatable occupant protection device (18) is inflatable. The vehicle occupant protection apparatus (10) also includes a cover (30) having an attachment portion (34) and a deployment door portion (36). The attachment portion (34) is securable to the member (20) for positioning the deployment door portion (36) for closing the deployment opening (22). The cover (30) also includes a rupturable portion (134, 136, and 156) that ruptures for enabling inflation of the inflatable occupant protection device (18) through the deployment opening (22). At least a part of the rupturable portion (134, 136, and 156) is formed at a union of the attachment portion (34) and the deployment door portion (36).

13 Claims, 6 Drawing Sheets

U.S. PATENT DOCUMENTS

| | | | |
|---|---|---|---|
| 6,789,816 B2 * | 9/2004 | Mar et al. | 280/728.3 |
| 7,052,036 B2 * | 5/2006 | Lee et al. | 280/728.3 |
| 7,073,817 B2 * | 7/2006 | Rogers et al. | 280/728.2 |
| 7,121,577 B2 * | 10/2006 | Schenck et al. | 280/728.3 |
| 2001/0002749 A1 * | 6/2001 | Usami et al. | 280/741 |
| 2004/0188986 A1 * | 9/2004 | Rogers et al. | 280/728.3 |
| 2005/0212268 A1 * | 9/2005 | Nagy et al. | 280/728.2 |
| 2005/0263988 A1 * | 12/2005 | Welford | 280/728.3 |
| 2006/0038385 A1 * | 2/2006 | Baumbach et al. | 280/728.2 |
| 2006/0220351 A1 * | 10/2006 | Meson | 280/728.2 |
| 2007/0007754 A1 * | 1/2007 | Rybinski et al. | 280/728.3 |
| 2007/0018434 A1 * | 1/2007 | Hayashi | 280/728.3 |
| 2007/0029763 A1 * | 2/2007 | Hayashi | 280/728.3 |
| 2007/0045994 A1 * | 3/2007 | Preisler | 280/728.3 |
| 2007/0045995 A1 * | 3/2007 | Adler et al. | 280/728.3 |

FOREIGN PATENT DOCUMENTS

| | | |
|---|---|---|
| JP | 11139235 | 5/1999 |

* cited by examiner

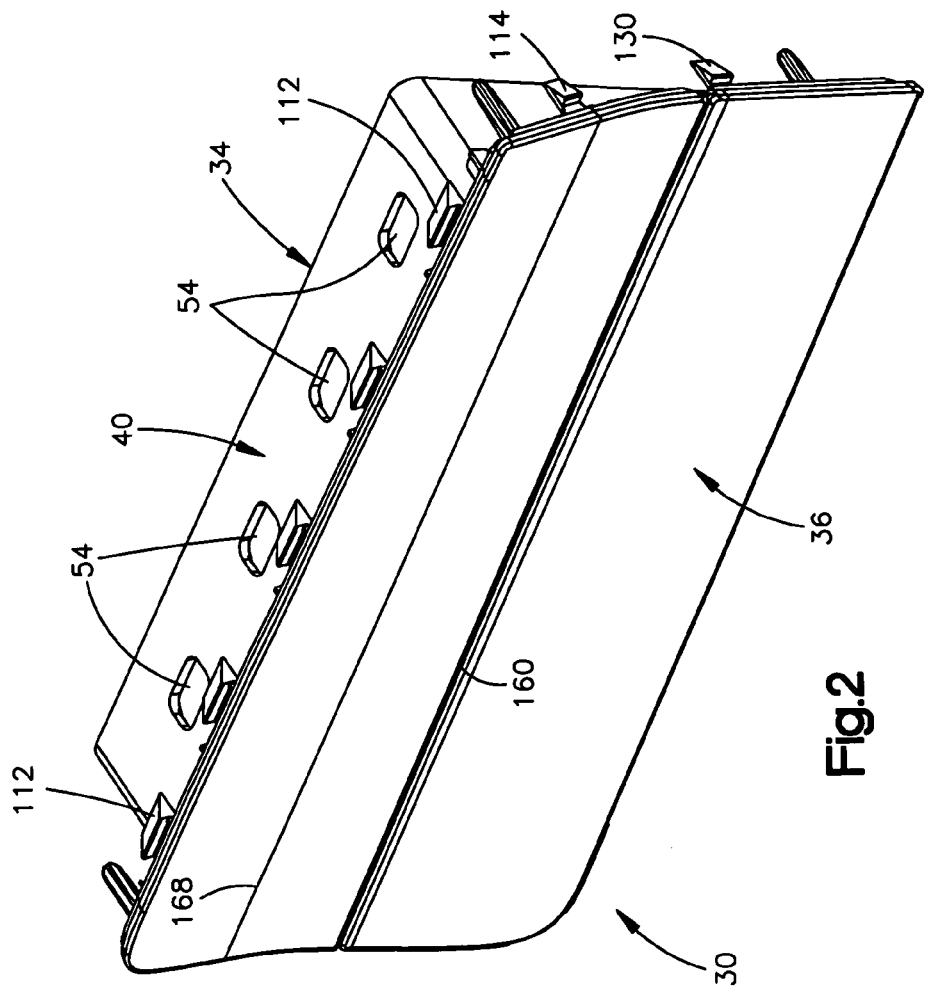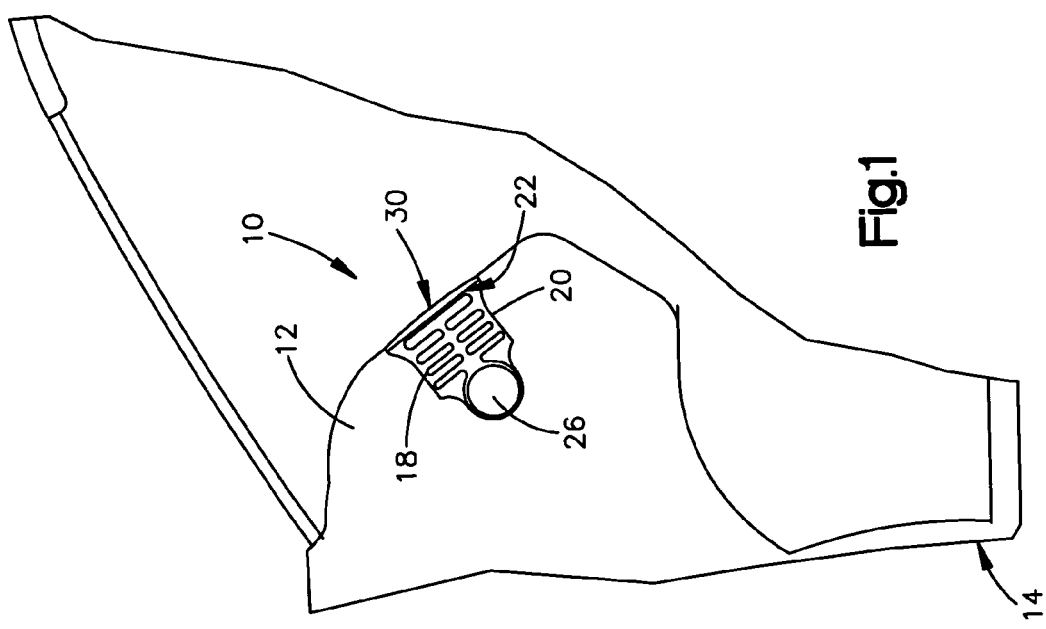

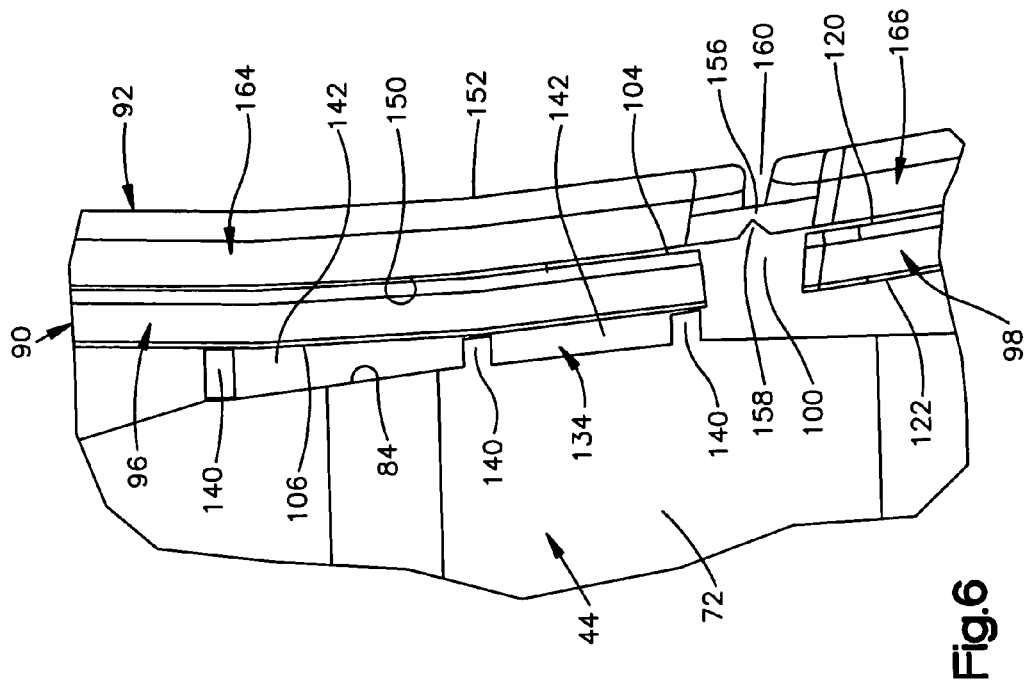
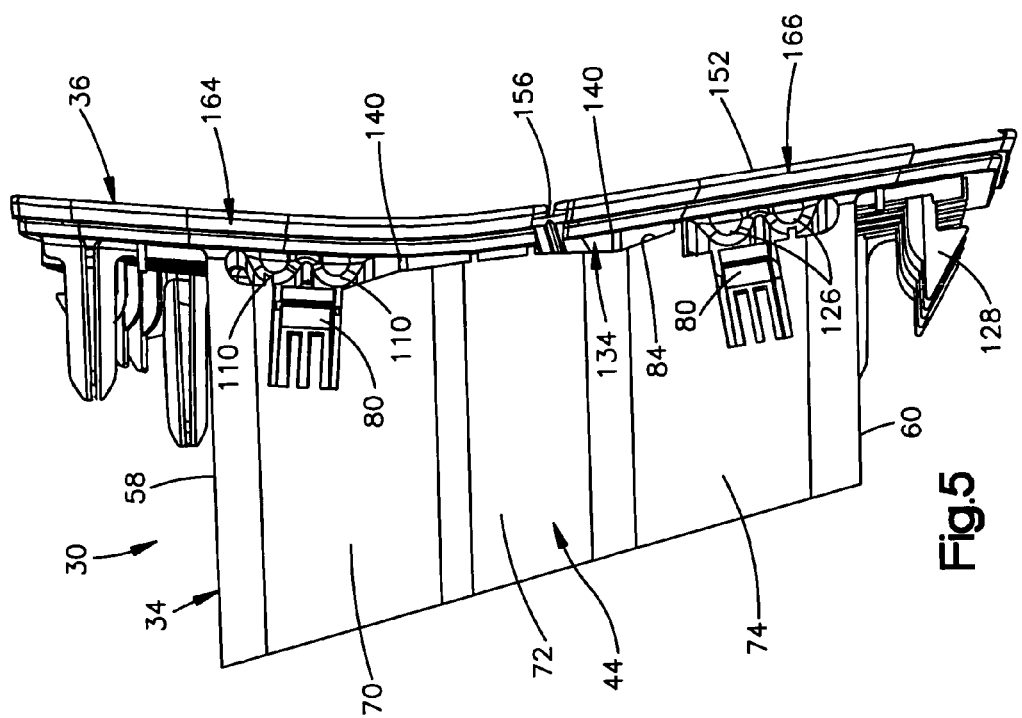

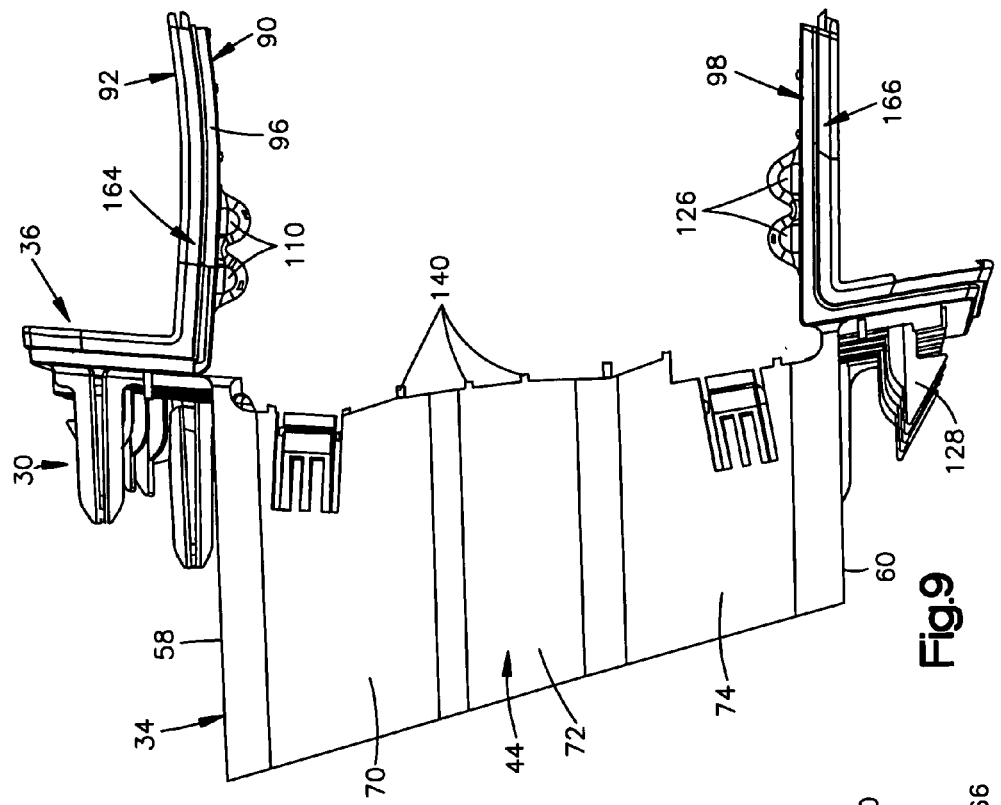
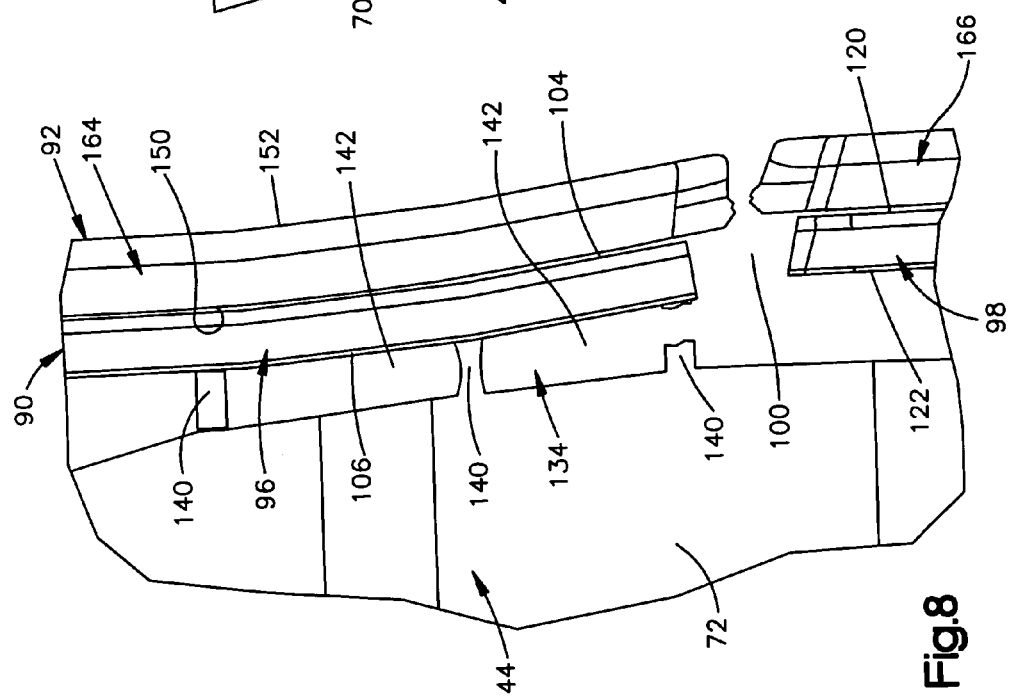

VEHICLE PROTECTION APPARATUS WITH COVER HAVING A RUPTURABLE PORTION WITH TEAR TABS

TECHNICAL FIELD

The present invention relates to a vehicle occupant protection apparatus. More particularly, the present invention relates to a vehicle occupant protection apparatus that includes a cover having a rupturable portion for enabling inflation of an inflatable occupant protection device through a deployment opening.

BACKGROUND OF THE INVENTION

A typical air bag module includes an air bag and an inflator for inflating the air bag from a deflated condition to an inflated condition. The air bag, when in the deflated condition, is typically overlaid and hidden from view by a cover. The cover commonly includes a portion that is ruptured by the inflating air bag to enable inflation of the air bag toward an occupant.

It is common for the rupturable portion of the cover to have a U-shape or an H-shape or any other suitable shape. Typically, rupturable portions having a U-shape or an H-shape include one horizontal and two vertical tear seams. For aesthetic purposes, the tear seams typically are formed on an interior (Class B) surface of the cover. Even when the tear seams are formed on the interior surface of the cover, evidence of the tear seams often is visible on the exterior (class A) surface of the cover. For example, slight indentions may be visible on the exterior surface of the cover at locations corresponding to tears seams. The evidence of the tear seams raises aesthetic concerns with vehicle designers.

Style lines may or may not be added to the exterior surface of the cover for hiding the evidence of the tear seams. Style lines are common for hiding the evidence of [horizontal] tear seams. Vertical style lines, however, are uncommon. As a result, a cover that eliminates the aesthetic concerns associated with vertical tear seams is desirable.

SUMMARY OF THE INVENTION

The present invention relates to a vehicle occupant protection apparatus comprising an inflatable occupant protection device. The vehicle occupant protection apparatus also comprises a member that defines a deployment opening through which the inflatable occupant protection device is inflatable. The vehicle occupant protection apparatus further comprises a cover that includes an attachment portion and a deployment door portion. The attachment portion is securable to the member for positioning the deployment door portion for closing the deployment opening. The cover also includes a rupturable portion that ruptures for enabling inflation of the inflatable occupant protection device through the deployment opening. At least part of the rupturable portion is formed at a union of the attachment portion and the deployment door portion.

According to another aspect, the present invention relates to a vehicle occupant protection apparatus comprising an inflatable occupant protection device and a member defining a deployment opening through which the inflatable occupant protection device is inflatable. The vehicle occupant protection apparatus also comprises a cover that includes an attachment portion and a deployment door portion. The attachment portion is securable to the member for positioning the deployment door portion for closing the deployment opening. The cover also includes a rupturable portion that ruptures for enabling inflation of the inflatable occupant protection device through the deployment opening. A plurality of tear tabs form at least part of the rupturable portion. The tear tabs are spaced apart from one another and connect the attachment portion to the deployment door portion.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a view of a vehicle occupant protection apparatus constructed in accordance with the present invention and mounted in an instrument panel of a vehicle;

FIG. 2 is a front perspective view of the cover of the vehicle occupant protection apparatus of FIG. 1;

FIG. 5 is a side view of the cover of FIG. 2 and illustrates part of a rupturable portion of the cover;

FIG. 6 is an enlarged view of a portion of FIG. 5;

FIG. 8 is an enlarged view illustrating a portion of the cover during rupturing of the rupturable portion; and FIG. 9 is a side view of the cover and illustrates the deployment door portion in an open condition.

DETAILED DESCRIPTION OF THE INVENTION

Figure 3:
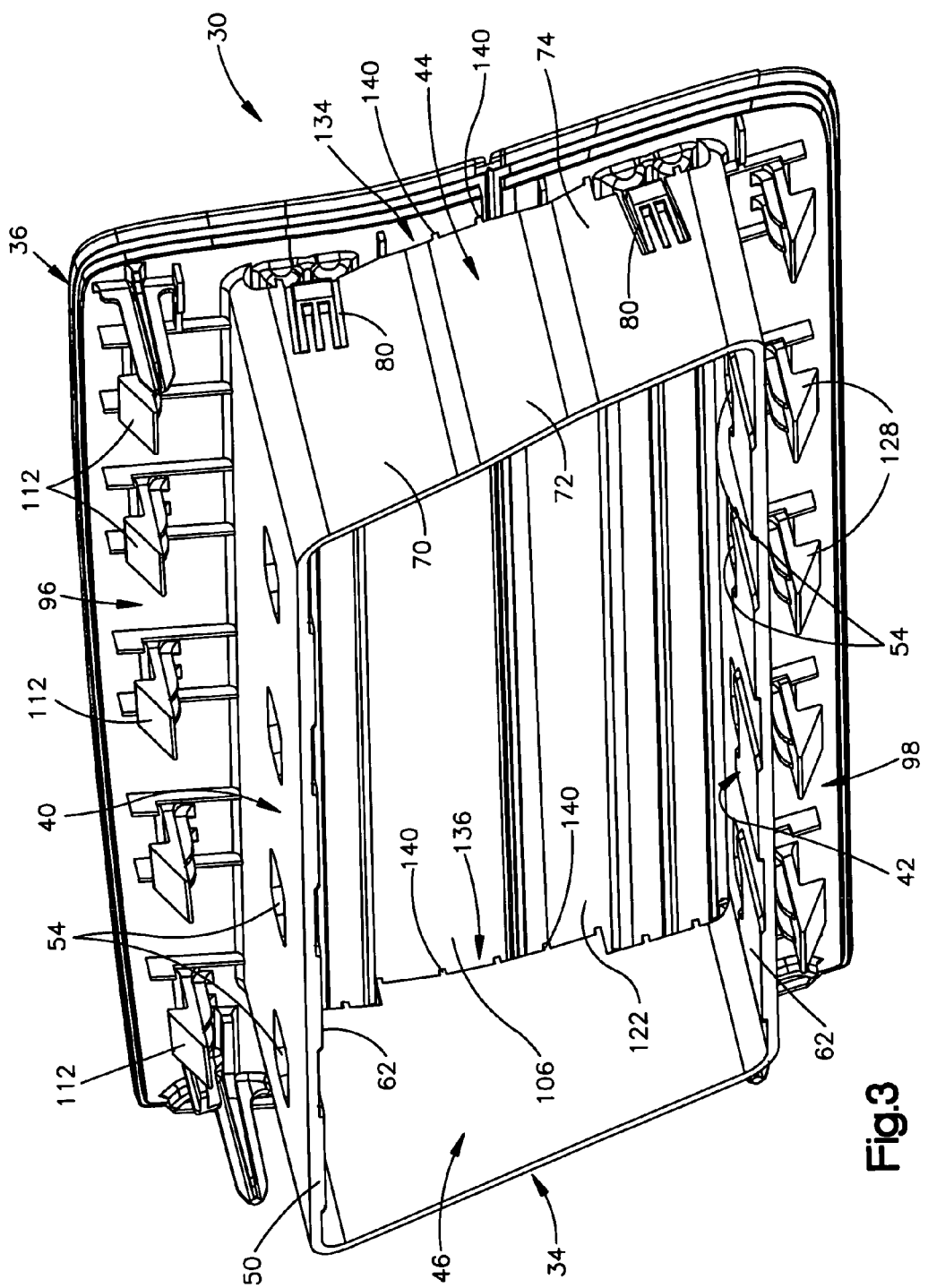
FIG. 3 is a rear perspective view of the cover of FIG. 2.

FIG. 1 illustrates a vehicle occupant protection apparatus 10 constructed in accordance with the present invention. The vehicle occupant protection apparatus 10 of FIG. 1 is a passenger side air bag module that is mounted in an instrument panel 12 of a vehicle 14.

The air bag module 10 of FIG. 1 includes an air bag 18. The air bag 18, when in a stored condition, is located in an air bag housing 20. The air bag housing 20 of FIG. 1 is a reaction canister that is mounted in the instrument panel 12 of the vehicle 14. The reaction canister 20 includes a deployment opening 22 through which the air bag 18 is inflatable. In FIG. 1, the reaction canister 20 supports the air bag 18.

The air bag module 10 also includes an inflation fluid source. The inflation fluid source illustrated in FIG. 1 is an inflator 26 that is actuatable for providing inflation fluid. The inflator 26 may be any convention type of inflator that is actuatable for providing inflation fluid. The inflator 26 of FIG. 1 is located in the reaction canister 20 and is supported by the reaction canister.

The air bag 18 receives the inflation fluid provided by actuation of the inflator 26. In response to receiving inflation fluid, the air bag 18 inflates through the deployment opening 22 in the reaction canister 20 and in a direction outward of the instrument panel 12.

The air bag module 10 also includes a cover 30 for covering the deployment opening 22 of the reaction canister 20. As will be described in greater detail below, the cover 30 includes a rupturable portion that is ruptured by the inflating air bag 18 for enabling the air bag to exit the reaction canister 20 through the deployment opening 22.

With reference to FIGS. 2 and 3, the cover 30 includes an attachment portion 34 and a deployment door portion 36. As shown in FIG. 3, the attachment portion 34 is generally rectangular in shape and includes an upper wall 40, a lower wall 42, and opposite inboard and outboard side walls 44 and 46, respectively. A generally rectangular passage that forms a chute for the inflating air bag extends through the attachment portion 34.

As best shown in FIG. 3, the upper and lower walls 40 and 42 extend parallel to one another and are spaced apart by the inboard and outboard side walls 44 and 46. while the drawings show that the upper and lower walls extend parallel, such is not necessary in all constructions through out the extent of the walls. The upper wall 40 has a length, measured longitudinally between a front edge (not shown), to which the deployment door portion 36 is attached, and a rear edge 50 of the attachment portion 34 that is approximately fifty percent longer than the lower wall 42. This is true of the construction shown, but is not a requirement for practicing the invention.

Multiple through-holes 54 extend through the upper and lower walls 40 and 42. The through holes 54 are spaced laterally apart from one another and are spaced equidistance from one another. The through-holes 54 are sized for receiving locking members (not shown) located on the reaction canister 20 for securing the cover 30 to the reaction canister.

The material thickness of the upper and lower walls 40 and 42 is increased between the through-holes 54 and the rear edge 50 of the attachment portion. The increased material thickness provides for increased strength of the upper and lower walls 40 and 42 between the through-holes 54 and the rear edge 50. The upper and lower walls 40 and 42 have generally planar exterior surfaces 58 and 60 (FIG. 5), respectively. The increased material thickness forms undulations 62 (FIG. 3) on the interior surfaces of the upper and lower walls 40 and 42.

The inboard and outboard side walls 44 and 46 connect opposite ends of the upper and lower walls 40 and 42. The outboard side wall 46 is generally planar and extends generally perpendicular to the upper and lower walls 40 and 42. As shown in FIG. 5, the inboard wall 44 includes an upper section 70, a central section 72, and a lower section 74. The upper and lower sections 70 and 74 of the inboard side wall 44 extend parallel to one another. The central section 72 tapers outward, i.e., away from the outboard side wall 46, as it extends between the upper and lower sections 70 and 74. As a result, the lower section 74 of the inboard side wall 44 is spaced away from the outboard side wall 46 by a slightly larger distance than the upper section 70.

Figure 7:
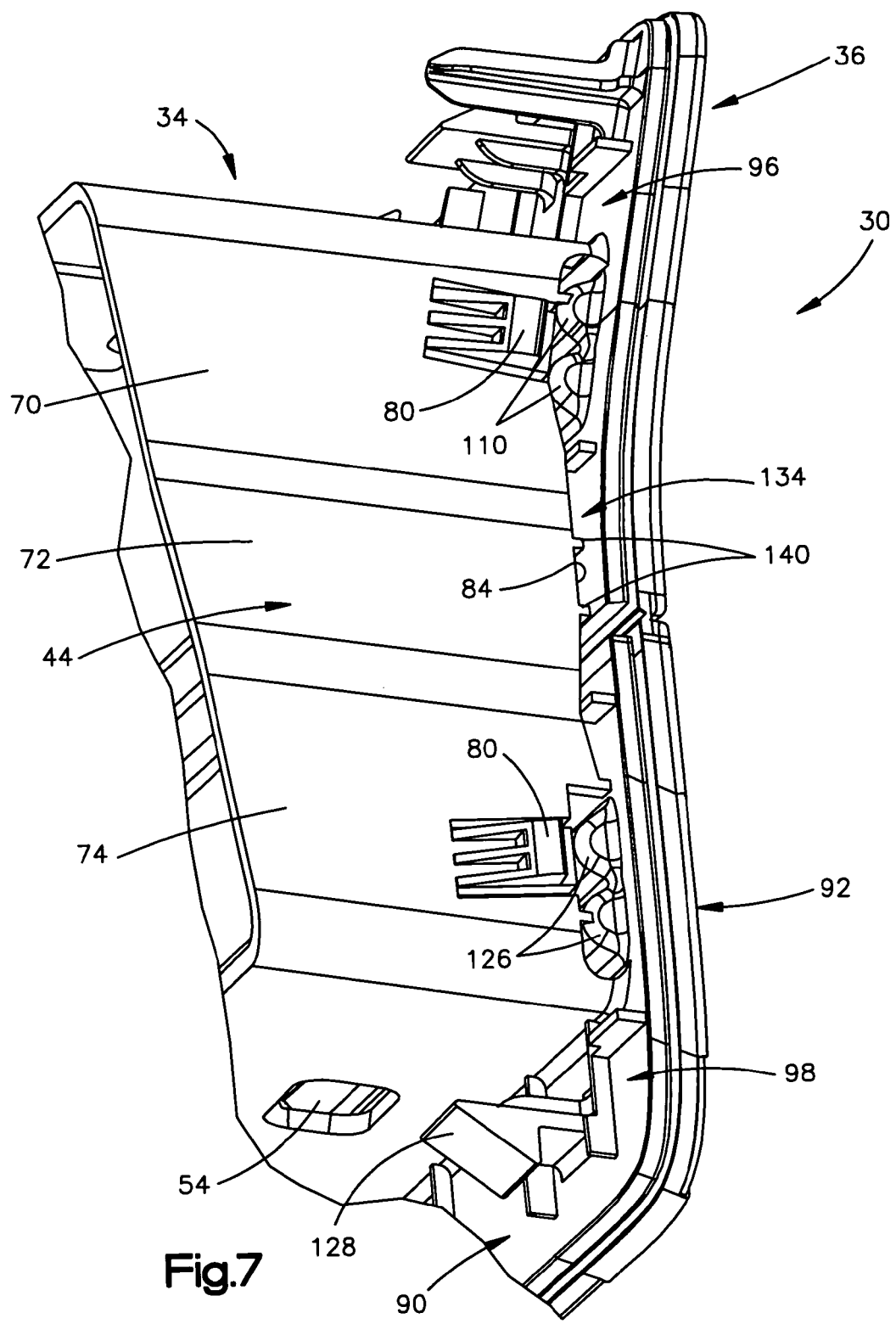
FIG. 7 is a perspective view of a side of the cover of FIG. 2.

Two locking tabs 80 (FIGS. 3, 5, and 7) are formed on an external surface of the inboard side wall 44. One locking tab 80 is located in the upper section 70 of the inboard side wall 44 adjacent a front edge 84 (FIG. 7) of the inboard sidewall. The other locking tab 80 is located in the lower section 74 of the inboard side wall 44 adjacent the front edge 84. The locking tabs 80 are adapted to interlock with portions of the instrument panel 12 for securing the cover 30 relative to the instrument panel.

Figure 4:
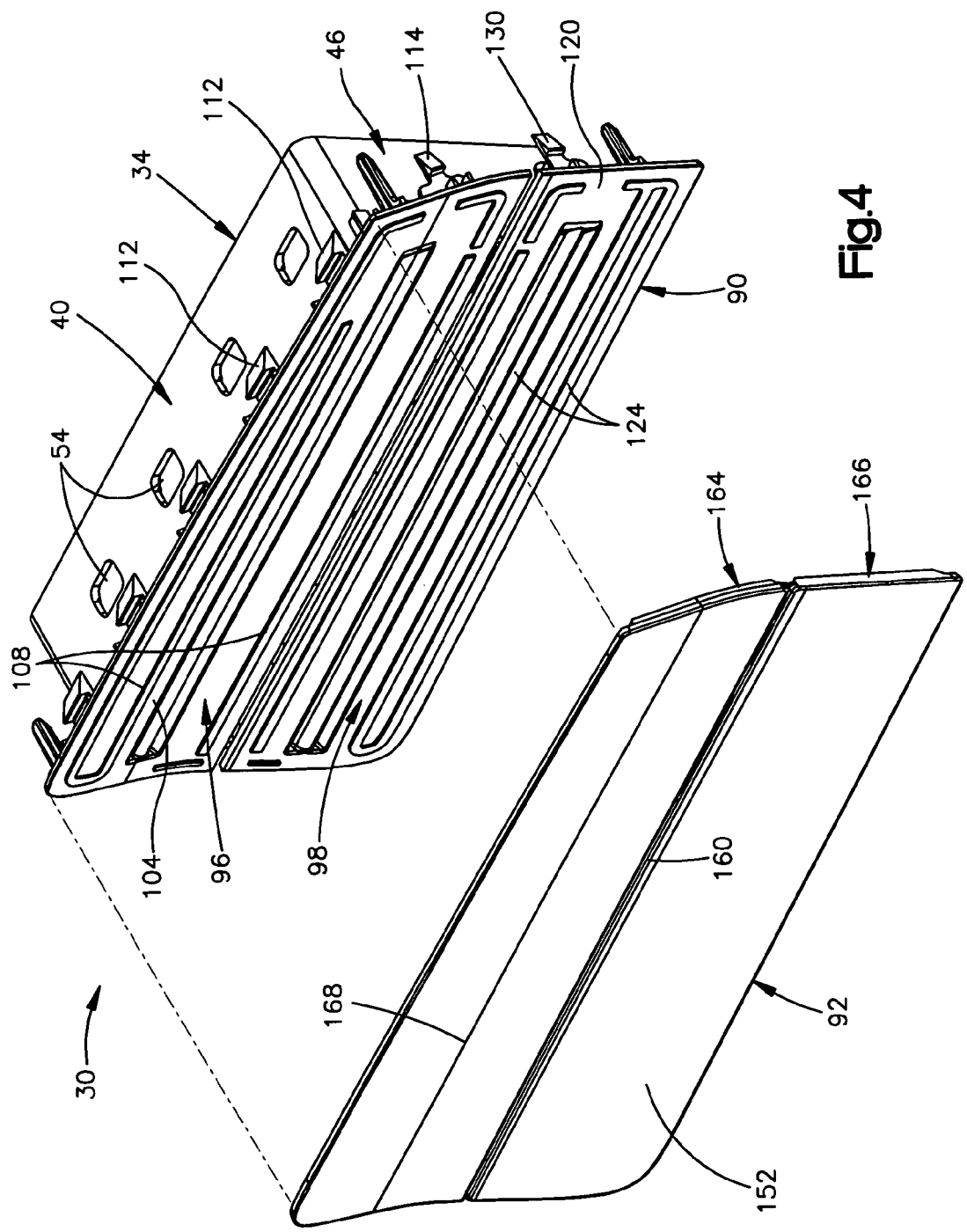
FIG. 4 an exploded perspective view of the cover of FIG. 2.

The deployment door portion 36 of the cover 30 may be a single piece door, with or without a coating of paint, and not formed from separate structures secured together or may include separate structures secured together. By way of example the drawings illustrate a door portion 36 that includes inner and outer members 90 and 92 (FIG. 4) that are vibration welded together. Alternatively, a single member deployment door portion may be used. The inner member 90 of the deployment door portion 36 is formed integrally with the attachment portion 34 and not from separate structures secured together. In a preferred embodiment, the attachment portion 34 and the inner member 90 of the deployment door portion 36 are injected molded in a single shot injection molding machine. As shown in FIG. 4, the inner member 90 of the deployment door portion 36 includes an upper door portion 96 and a lower door portion 98. A horizontally extending gap 100 (FIG. 6) extends across the inner member 90 and separates the upper and lower door portions 96 and 98.

The upper door portion 96 is attached to the front edge of the upper wall 40 of the attachment portion 34 and to the front edges, only front edge 84 shown, of the uppermost halves of the inboard and outboard side walls 44 and 46. The upper door portion 96 includes an exterior surface 104 (FIG. 4) and an interior surface 106 (FIG. 3). As FIG. 4 illustrates, ribs 108 extend outwardly of the exterior surface 104 of the upper door portion 96. Two horizontal ribs 110 (FIGS. 5, 7, and 9) extend laterally across the interior surface 106 of the upper door portion 96 from a location adjacent the inboard side wall 44 to a location adjacent the outboard side wall 46. The horizontal ribs 110 act as hinge line/relief between the two vibration welded door parts 90, 92.

Multiple locking members 112 (FIG. 3) extend outwardly of the interior surface 106 of the upper door portion 96 at a location above the upper wall 40 of the attachment portion 34. The locking members 112 are spaced laterally away from one another and are adapted to interlock with portions of the instrument panel 12 for securing the cover 30 relative to the instrument panel. A single locking member 114 (FIG. 4) extends outwardly of the interior surface 106 of the upper door portion 96 at a location adjacent the outboard side wall 46 of the attachment portion 34. The locking member 114 is adapted to interlock with a portion of the instrument panel 12 for securing the cover 30 relative to the instrument panel.

The lower door portion 98 is attached to the front edge of the lower wall 42 of the attachment portion 34 and the front edges, only front edge 84 shown, of the lowermost halves of the inboard and outboard side walls 44 and 46. The lower door portion 98 includes an exterior surface 120 (FIG. 4) and an interior surface 122 (FIG. 3). As FIG. 4 illustrates, ribs 124 extend outwardly of the exterior surface 120 of the lower door portion 98. Two horizontal ribs 126 (FIGS. 5, 7, and 9) extend laterally across the interior surface 122 of the lower door portion 98 from a location adjacent the inboard side wall 44 to a location adjacent the outboard side wall 46. The horizontal ribs 126 act to provide as hinge line/relief between the two vibration welded door parts 90, 92.

Multiple locking members 128 (FIG. 3) extend outwardly of the interior surface 122 of the lower door portion 98 at a location below the lower wall 42 of the attachment portion 34. The locking members 128 are spaced laterally away from one another and are adapted to interlock with portions of the instrument panel 12 for securing the cover 30 relative to the instrument panel. A single locking member 130 (FIG. 4) extends outwardly of the interior surface 122 of the lower door portion 98 at a location adjacent the outboard side wall 46 of the attachment portion 34. The locking member 130 is adapted to interlock with a portion of the instrument panel 12 for securing the cover 30 relative to the instrument panel.

Vertical tear portions 134 and 136 (FIG. 3) are formed at the unions of the inner member 90 of the deployment door portion 36 and the inboard and outboard side walls 44 and 46, respectively, of the attachment portion 34. As shown with reference to FIG. 3, the vertical tear portions 134 and 136 include multiple spaced apart tear tabs 140. FIG. 6 is an enlarged view illustrating the tear tabs 140 at the union of the inboard side wall 44 and the upper portion 96 of the inner member 90. The tear tabs 140 connect the front edge 84 of the inboard side wall 44 to the interior surfaces 106 and 122 of the upper and lower door portions 96 and 98, respectively, of the inner member 90. Gaps 142 (FIG. 6) between the front edge 84 of the inboard side wall 44 and the interior surfaces 106 and 122 of the upper and lower door portions 96 and 98, respectively, are formed between the tear tabs 140. The tear tabs 140 and gaps 142 at the union of the outboard side wall 46 and the inner member 90 are similar to those at the union of the inboard side wall 44 and the inner member.

The outer member 92 of the deployment door portion 36 of the cover 30 is generally rectangular and includes interior and exterior surfaces 150 and 152 (FIG. 6), respectively. A horizontally extending tear seam 156 (FIG. 6) extends completely across the outer member 92. Alternatively, the tear seam 156 could terminate short of the sides of the member 92. The tear seam 156 is formed by a thinned portion of the outer member 92 that is located between a recess 158 formed in the interior surface 150 of the outer member and a style line 160 formed in the exterior surface 152 of the outer member.

The tear seam 156 separates upper and lower door portions 164 and 166, respectively, of the outer member 92. The upper door portion 164 of the outer member 92 is slightly larger than the upper door portion 96 of the inner member 90 of the deployment door portion 36. Similarly, the lower door portion 166 of the outer member 92 is slightly larger than the lower door portion 98 of the inner member 90. A horizontal style line 168 (FIG. 4) extends across the exterior surface 152 of the upper door portion 164 of the outer member 92.

The inner and outer members 90 and 92 of the deployment door portion 36 of the cover 30 are vibration welded together. When the inner and outer members 90 and 92 are secured together, the tear seam 156 of the outer member 92 aligns with the gap 100 of the inner member 90, as shown in FIG. 6.

The tear seam 156 of the outer member 92 of the deployment door portion 36 and the vertical tear portions 134 and 136 formed at the unions of the inboard and outboard side walls 44 and 46 and the inner member 90 collectively form a rupturable portion of the cover 30. The rupturable portion of the cover 30 ruptures in response to a force of the inflating air bag 18 acting against the interior surfaces 106 and 122 of the inner member 90 of the deployment door portion 36. When the rupturable portion is ruptured, the deployment door portion 36 of the cover 30 moves from a position closing the deployment opening 22 to an open condition for enabling inflation of the air bag 18 through the cover and outward of the instrument panel 12. FIG. 9 illustrates the deployment door portion 36 in an open condition. As an alternative to the embodiment illustrated in FIG. 9 in which the deployment door portion 36 includes hinge lines (not shown) about which portion of the door bend, the upper door portions 96 and 164 of the inner and outer members 90 and 92, respectively, may pivot about the front edge of the upper wall 40 of the attachment portion 34 and the lower portions 98 and 166 of the inner and outer members 90 and 92, respectively, may pivot about the front edge of the lower wall 42 of the attachment portion.

During inflation of the air bag 18, the force of the inflating air bag 18 on the interior surfaces 106 and 122 of the inner member 90 of the deployment door portion 36 tends to force the upper door portions 96 and 164 of the inner and outer members 90 and 92, respectively, of the deployment door portion apart from the lower door portions 98 and 166. As a result, the tear seam 156 of the outer member 92 of the deployment door portion 36 ruptures. The rupture of the tear seam 156 of the outer member 92 generally begins at a central location and simultaneously extends laterally outward toward inboard and outboard edges of the outer member.

After the tear seam 156 of the outer member 92 of the deployment door portion 36 is ruptured, the force of the inflating air bag 18 tends to move the upper door portions 96 and 164 further apart from the lower door portions 98 and 166. As a result, the force ruptures the vertical tear portions 134 and 136 located at the unions of the inner member 90 of the deployment door portion 36 and the inboard and outboard side walls 44 and 46 of the attachment portion 34. Moreover, the vertical tear portions 134, 136 could rupture before, during, or after rupture of the horizontal door portion 36.

The tear tabs will tear in a manner that depends upon tear seam location, door shape and bag fold. In the illustrated embodiment, when the upper door portions 96 and 164 and the lower door portions 98 and 166 of the inner and outer members 90 and 92, respectively, of the deployment door portion 36 begin to move away from one another, the tear tabs 140 located closest to the ruptured tear seam 156 are stretched. The stretching of the tear tabs 140 causes the tear tabs to rupture, as shown with reference to FIG. 8. The tear tabs 140 are ruptured sequentially beginning with the tear tabs located closest to the tear seam 156 and ending with the tear tabs located farthest from the tear seam. The rupturing of the tear tabs 140 enables the deployment door portion 36 to move from a position closing the deployment opening 22 to the open condition illustrated in FIG. 9.

The tear tabs 140 of the illustrated embodiment have generally square cross-sectional shapes. The illustrated tear tabs 140 also have a generally uniform material thickness along a length of the tear tabs. The tear tabs 140 may have any cross-sectional shape and may have a varying material thickness. For example, the tear tabs may be cylindrical and may include thinned portions that defines locations at which the tear tabs rupture. Additionally, the material properties of the tear tabs and the shape of the tear tabs may be adjusted for controlling the force necessary for rupturing the tear tabs.

From the above description of the invention, those skilled in the art will perceive improvements, changes, and modifications. Such improvements, changes, and modifications within the skill of the art are intended to be covered by the appended claims.

Having described the invention, the following is claimed:

1. An apparatus for helping to protect an occupant of a vehicle, the apparatus comprising:
    an inflatable occupant protection device;
    a member defining a deployment opening in an instrument panel of a vehicle through which the inflatable occupant protection device is deployable; and
    a cover for covering the deployment opening, the cover comprising:
    a deployment door;
    an attachment portion connectable with the member, the attachment portion comprising a side wall that extends transversely from a lower surface of the deployment door, the sidewall being spaced from peripheral edges of the deployment door leaving a peripheral portion of the deployment door extending beyond the side wall, the side wall extending along the entire periphery of the deployment opening; and
    a rupturable portion comprising a plurality of tear tabs that connect the side wall to the lower surface of the deployment door along opposite sides of the attachment portion, the tear tabs being spaced apart from each other leaving segments between the tear tabs where the side wall and lower surface are free from connection to each other.

2. The apparatus recited in claim 1, wherein the deployment door has a closed condition spanning across the deployment opening to close the deployment opening and conceal the protection device in a pre-deployment condition, the rupturable portion being rupturable to permit deployment of the protection device through the deployment opening.

3. The apparatus recited in claim 1, wherein the portion of the rupturable portion connecting the side wall to the lower surface of the deployment door is a vertical component of the rupturable portion, a horizontal component of the rupturable portion being formed by a tear seam in the deployment door.

4. The apparatus recited in claim 1, wherein the tear tabs connect inboard and outboard portions of the side walls to the deployment door.

5. The apparatus recited in claim 1, wherein the tear tabs form a vertical component of the rupturable portion, the rupturable portion further comprising a tear seam extending across the deployment door to form a horizontal component of the rupturable portion.

6. The apparatus recited in claim 5, wherein the tear seam separates upper and lower door portions of the deployment door, movement of the upper and lower door portions away from one another during inflation of the inflatable occupant protection device rupturing the tear tabs.

7. The apparatus recited in claim 1, wherein the deployment door portion includes inner and outer members, the portion of the rupturable portion connecting the side wall to the lower surface of the deployment door connecting the side wall to the inner member.

8. The apparatus recited in claim 7, wherein the inner member of the deployment door portion and the attachment portion are formed integrally with one another and not from separate structures secured together.

9. The apparatus recited in claim 1, wherein the side wall comprises apertures that engage with locking members to secure the attachment portion to the member.

10. The apparatus recited in claim 1, wherein the side wall has a generally rectangular configuration that extends along the generally rectangular deployment opening.

11. The apparatus recited in claim 1, wherein the attachment portion comprises spaced parallel upper and lower walls and spaced parallel inboard and outboard walls that extend between and interconnect the upper and lower walls, the rupturable portion comprising a plurality of spaced tear tabs that connect the inboard and outboard walls to the inner surface of the deployment door.

12. The apparatus recited in claim 11, wherein the deployment door is connected to the attachment portion along at least one of the upper and lower walls to form a hinge portion about which at least a portion of the deployment door pivots upon deployment of the protection device.

13. The apparatus recited in claim 11, wherein the deployment door further comprises a tear seam that extends from adjacent or near the inboard wall to adjacent or near the outboard wall.

* * * * *